United States Patent [19]

Falkensson et al.

[11] Patent Number: 5,167,477
[45] Date of Patent: Dec. 1, 1992

[54] CHAMFERING DEVICE AND TOOL HOLDER THEREFOR

[75] Inventors: Rickard Falkensson, Amerikagatan 1 E, S-414 63 Göteborg, Sweden; Göran Linderoth, Kaptensgatan 20 B, S-414 58 Göteborg, Sweden; Henry Wiklund, Arbrå, Sweden

[73] Assignees: Richard Falkensson; Göran Linderoth, Sweden

[21] Appl. No.: 832,936

[22] Filed: Feb. 10, 1992

[51] Int. Cl.$^5$ ............................................. B23C 1/20
[52] U.S. Cl. .................. 409/178; 144/134 D; 408/110; 409/180
[58] Field of Search ............. 409/175, 178, 179, 180, 409/181, 182, 190, 138; 144/134 D, 136 C; 408/188, 241.5, 202, 113, 110

[56] References Cited

U.S. PATENT DOCUMENTS

| | | | |
|---|---|---|---|
| 2,304,405 | 12/1942 | Green | 409/179 |
| 3,196,749 | 7/1965 | Zanni | 409/190 |
| 3,553,904 | 1/1971 | Wallace | 409/175 X |
| 4,792,266 | 12/1988 | Willis | 409/182 |
| 4,923,343 | 5/1990 | Silk | 409/179 |
| 4,946,323 | 8/1990 | Kazama | 409/178 |
| 5,018,914 | 5/1991 | Kishi | 409/178 |

FOREIGN PATENT DOCUMENTS

| | | | |
|---|---|---|---|
| 15483 | 6/1956 | Fed. Rep. of Germany | 409/175 |
| 13282 | 2/1978 | Japan | 409/179 |

*Primary Examiner*—William Briggs
*Attorney, Agent, or Firm*—Ostrolenk, Faber, Gerb & Soffen

[57] ABSTRACT

A chamfering device incorporating a power tool for driving a rotary bur or the like provided with an elongated shaft and a cutting head, wherein the shaft is enclosed at a small clearance by a first, mainly tubular member, which, after mounting of the shaft with the said first member fitted thereto in the power tool, is held in position by a second, mainly tubular member, which is fixed to the power tool and is connected to the first member thereby arresting this in position, a third, mainly tubular member being provided over the second member, said third member being displaceable in the axial direction of the second member and lockable in occupied positions, said third member being an adjustable extension of the second member.

7 Claims, 5 Drawing Sheets

1

CHAMFERING DEVICE AND TOOL HOLDER THEREFOR

The present invention refers to a chamfering device according to preamble of claim 1, the object of which is to make possible, in a simple way to attain chamfering, e.g. deburring of hole edges and other edges, which from operator's point of view are situated at the rear side or inner side of a workpiece. The invention also incorporates a tool holder for such a chamfering device as defined in the preamble of claim 5.

It may for example be necessary to deburr or chamfer the internal orifice of a hole, which has been drilled from the outside through the lateral wall of a pipe or through one of two opposite side walls, which are situated so close to each other that there is no possibility to enter between them with a deburring tool, leaving the only possibility to enter from the outside. In similar manner it is possible that not only hole edges but also other edges of upwardly projecting flanges or the like may be accessible only from one direction.

THE STATE OF THE ART

In order to obtain chamfering and deburring it is known in such cases to use a hook-like tool provided with a shaft and with a cutting edge, which tool can be manually moved about the edges of a hole or the like. With this tool it is however for strength reasons only possible to scrape off relatively small burrs from otherwise rather smooth surfaces, which limits its field of application. In view of present technique it otherwise seems as if there is not available any simple and universally usable device which can be used as a handheld portable tool, which makes it unnecessary to mount the workpiece in a stationary machine and/or to adapt the very work tool on the device for the particular application, e.g. for fitting various hole diameters.

SHORT DESCRIPTION OF THE ADVANTAGES OF THE INVENTION

With the device according to the invention it is possible, at the location of the workpiece and without need for any tool kits or special arrangements for suiting different applications, manually to deburr and chamfer edges of the abovementioned type, rapidly, simply and with obtainment of a predetermined cutting angle and a predetermined cutting depth. The device may be designed as an attachment unit easy to mount and dismount to a power tool of standard type for driving a rotary bur or a milling cutter, whereby the initial costs for the device are reduced and whereby the power tool can be used also without the device according to the invention for performing working operations for which the latter is not intended. The device allows rapid and complete exposure of the chuck or collet of the power tool for mounting or dismounting the rotary bur or the milling cutter. By means of the device it is possible to follow curved working surfaces, such as the entire circumference of a hole, and to machine them without need for the operator to rotate the device in relation to the curvature in order to keep it correctly positioned against the working surface. These and other advantages, which will be evident from the following description, have been achieved with the device such as defined in the claims.

SHORT DESCRIPTION OF ACCOMPANYING DRAWINGS

Figure 5:
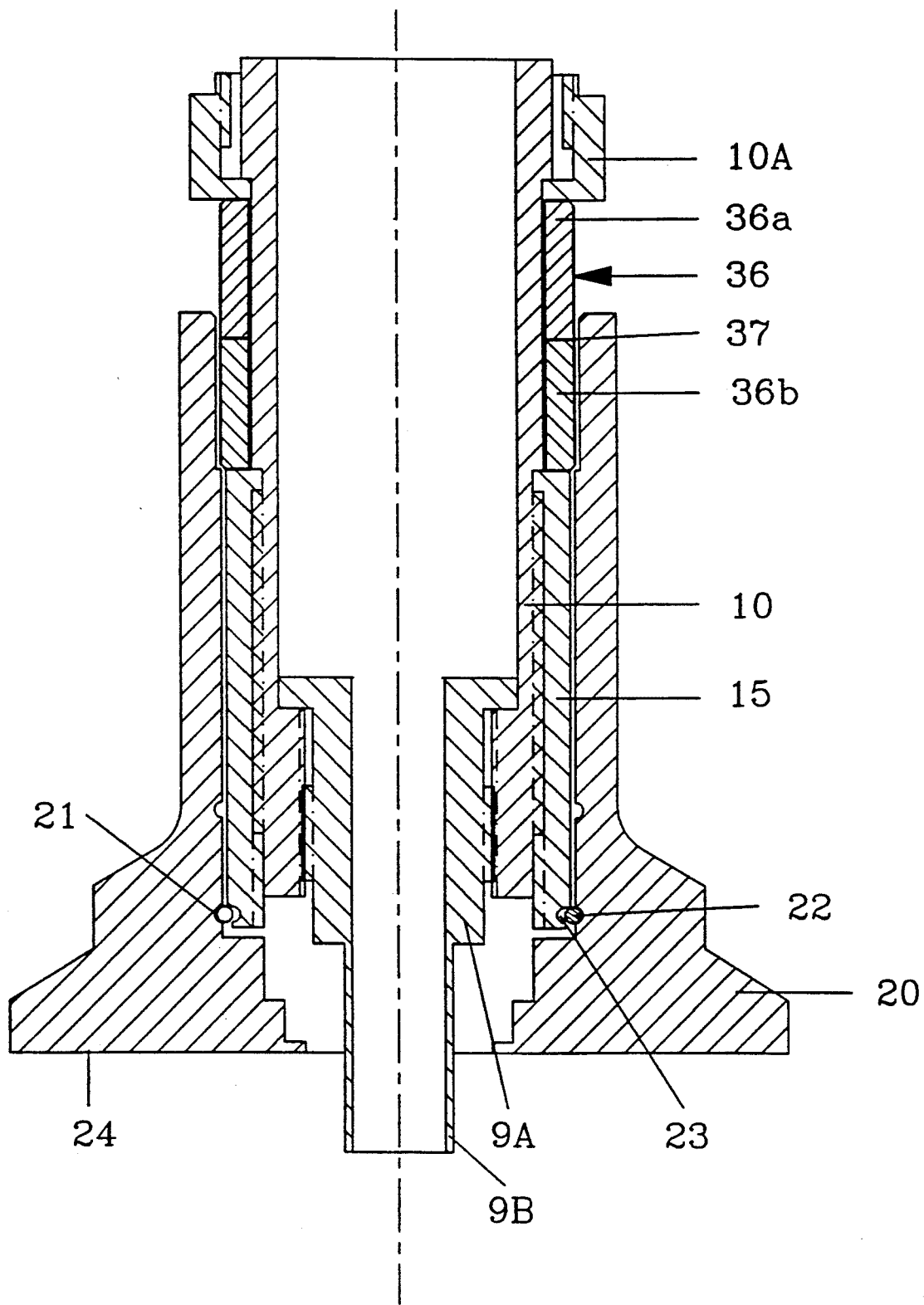
FIG. 5 shows schematically and in section part of a chamfering device in accordance with the invention and being equipped with a particularly favourable arrangement for easily adapting the device for treatment of workpieces of different wall thickness.
Figure 6A:
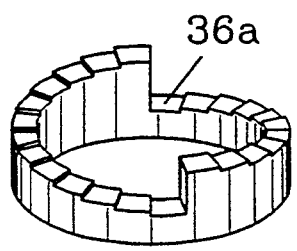
Figure 6B:
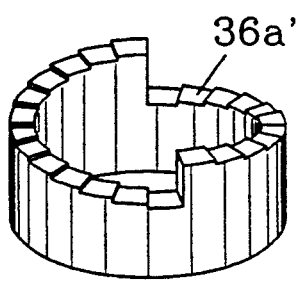
Figure 6C:
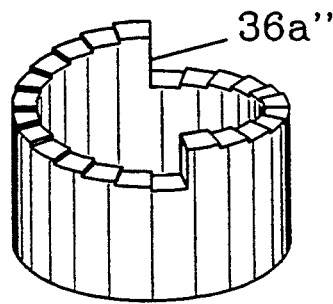
Figure 6D:
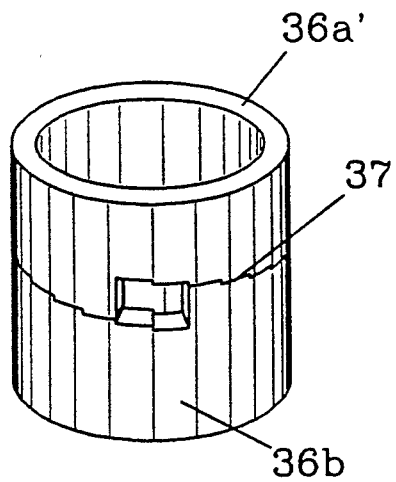
Figure 6E:
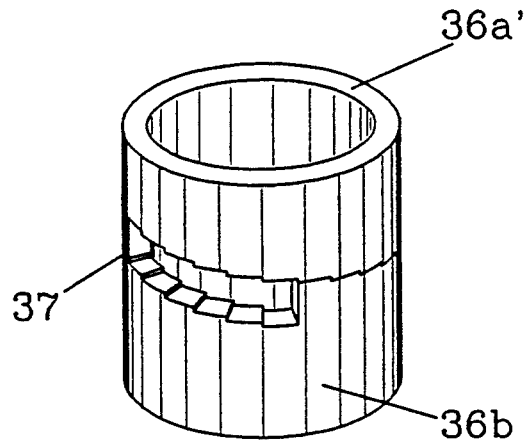
Figure 7:
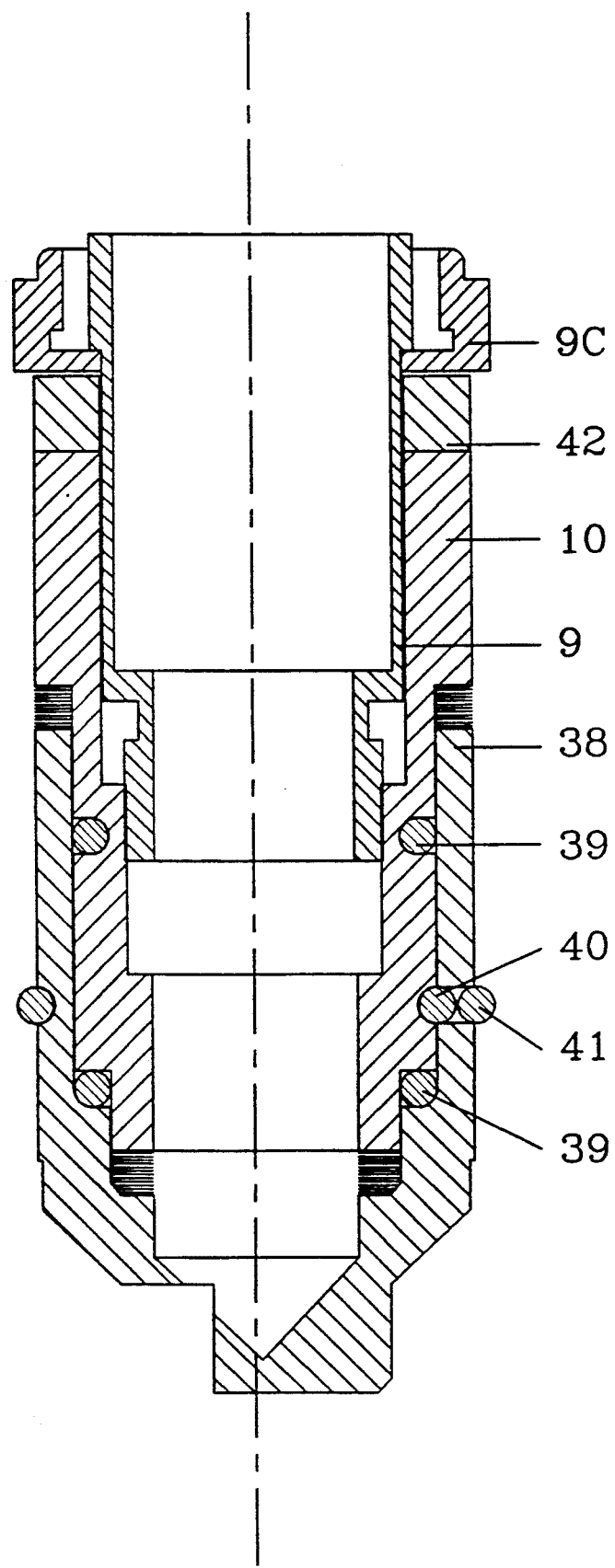

FIG. 6a–6c are perspective views showing one member of a two-piece split intermediate spacing ring, forming part of the device according to FIG. 5, in three different axial sizes, FIG. 6d and 6e show a two-piece split intermediate spacer ring, such as used in FIG. 5, in two different axial adjustment positions, and FIG. 7 is a schematical sectional view, of part of a chamfering device according to the invention, and having an adjustment arrangement of slightly other design than that according to FIG. 5 and being fitted to a chamfering device for deburring front edges.

DETAILED DESCRIPTION OF THE DEVICE ACCORDING TO INVENTION

In the drawings the front end of a not further shown power tool is denoted with reference numeral 1. A rotary shaft 2 provided with a key grip 3 for cooperation with a collet 5 having a hexagon head 4 projects from the front end of the power tool. In the collet is mounted a rotary bur 6, which comprises a shaft 7 and a cutting head 8. The bur shaft is surrounded with small play by a first tube 9, which has a thin-walled portion 9A and a stout portion gB with larger outer diameter than portion 9A. The cutting head 8 connects with a smaller end portion 8A to bur shaft 7 and increases successively in diameter towards a coarser end portion 8B. In the drawing the cutting edges of the head are shown curved in arc-form from the narrower portion 8A towards the coarser portion 8B, but they can also be straight, so that the cutting head will be conical, or they can be curved in opposite directions to be approximately ball shaped.

A second tube 10 surrounds the first tube 9 and is attached via a thread 11 to the front end of the power tool. The tube 10 has a key grip 12 for tightening the thread joint. The tube 10 adjoins with tight fit the coarse portion 9B of the first tube 9. A groove 12 is machined in said coarse portion for cooperation with a locking ring 13 provided in a groove or in slots 14 in the second tube 10.

A third sleeve-formed or tubular member 15 arranged about the second tube 10 is axially displaceable along tube 10. This third tube can be arrested in position relative to the second tube 10 by means of a knob-provided screw 16, acting against a locking ring 17 provided about the second tube. For position reading against an end surface 18 of the third tube a graduated scale 19 is provided on the second tube 10. An annular support member 20 is provided on the third tube 15, and this is held in position by means of a locking ring 22 provided in a groove 21 therein, and which locking ring cooperates with a groove 23 machined in the third tube.

The locking rings 13 and 22 may preferably be provided with portions which deviate in a direction inwards from an otherwise circular form and thereby engage the grooves 12 and 23 resp., at the same time as their remaining portions engage the grooves 14 and 21 resp.

Figure 1:
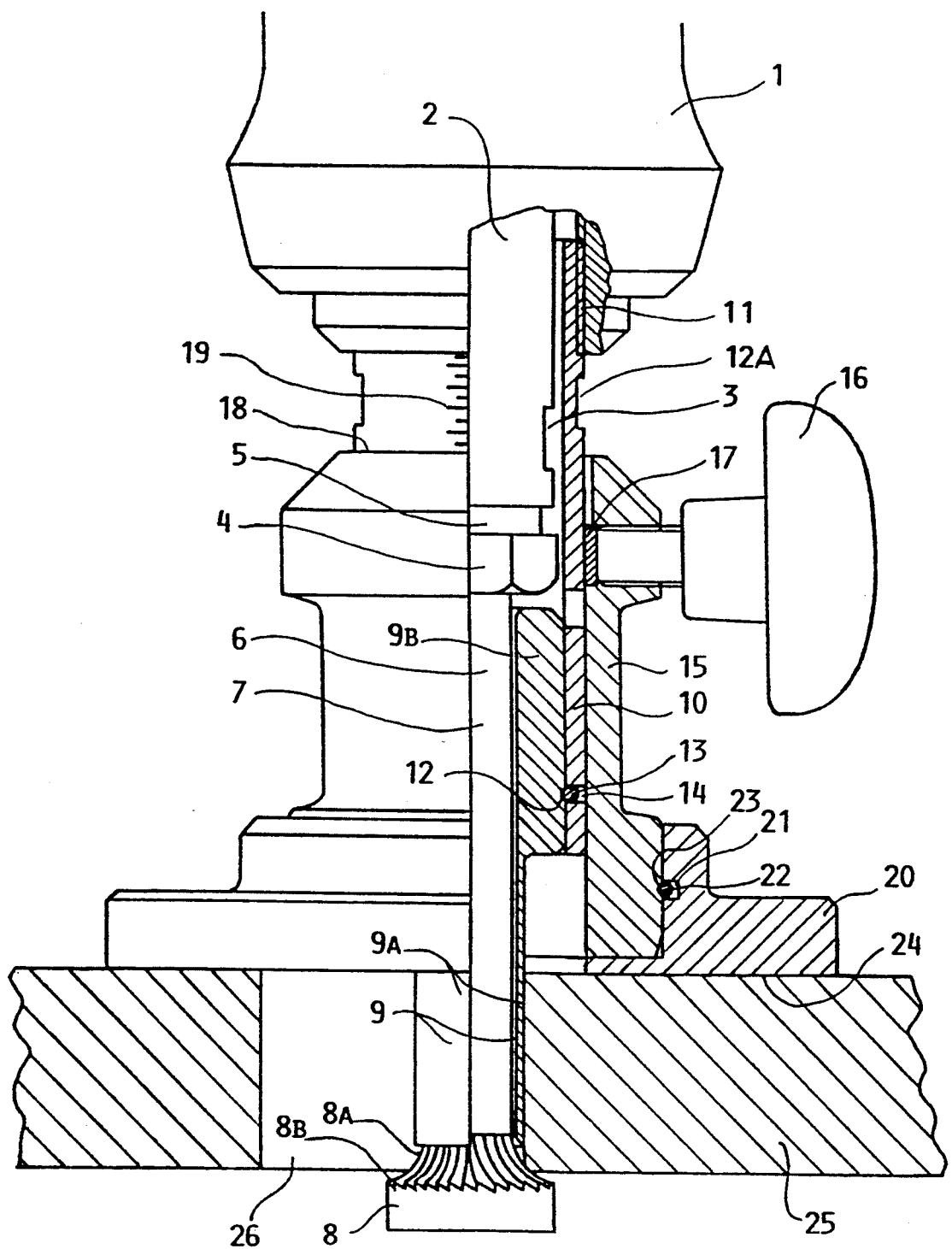
FIG. 1 is a lateral view, partly in section, of an embodiment of the device according to the invention.

In FIG. 1 the reference number 24 designates an end surface of the support member 20, while 25 is a workpiece provided with a through-hole 26.

Figure 2:
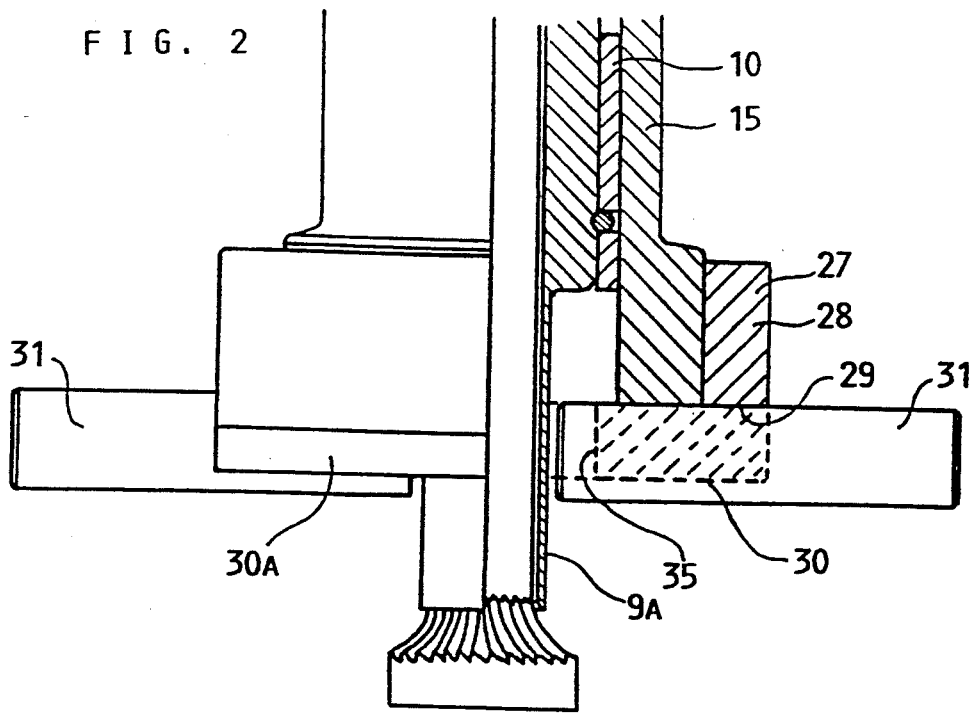
FIG. 2 is a detail side view, partly in section, of the device equipped with a different additional equipment.

FIG. 2 shows the device according to the invention provided with a support member 27, designed differently from support member 20 shown in FIG. 1. The member 27 has an annular portion 28, which is passed onto the third tube 15. At two diametrically opposed sides of the portion 28 are provided radially extending holes 29. The centres of the holes are positioned so close to a lower end surface 30 of the portion 28, that this is broken through when the holes are made. Two pins 31, which are inserted in the holes, therefore with a part of their circumferential surface will be situated outside the end surface 30. The pins are inserted almost to reach the tube portion 9a and can be retained e.g. by the support member 27 being made of a plastic material and the pins being inserted into the holes 29 with tight fit which gives high friction. The pins 31 are preferably made of steel. The end surface of the support member 27 can be divided into two portions 30a, 30b forming an angle to each other.

Figure 3:
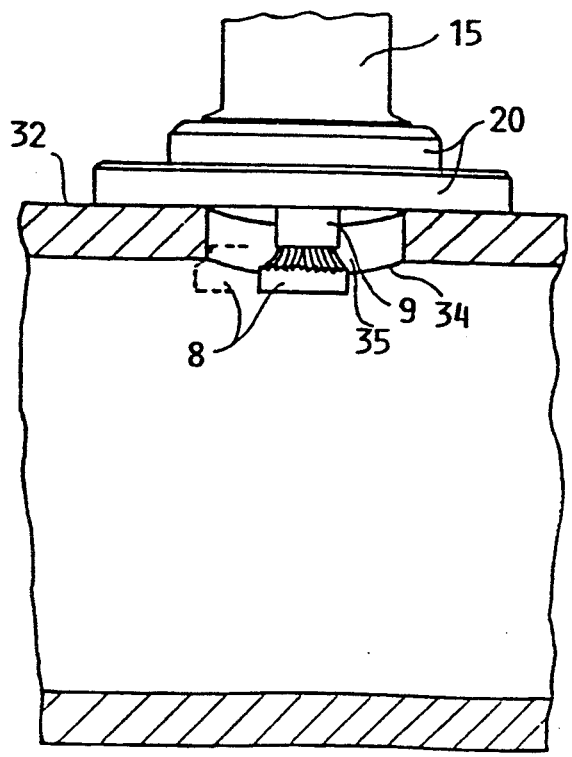
FIG. 3 and 4 are detail side views, partly in section showing examples of deburring holes made in the envelope surface of pipes.
Figure 4:
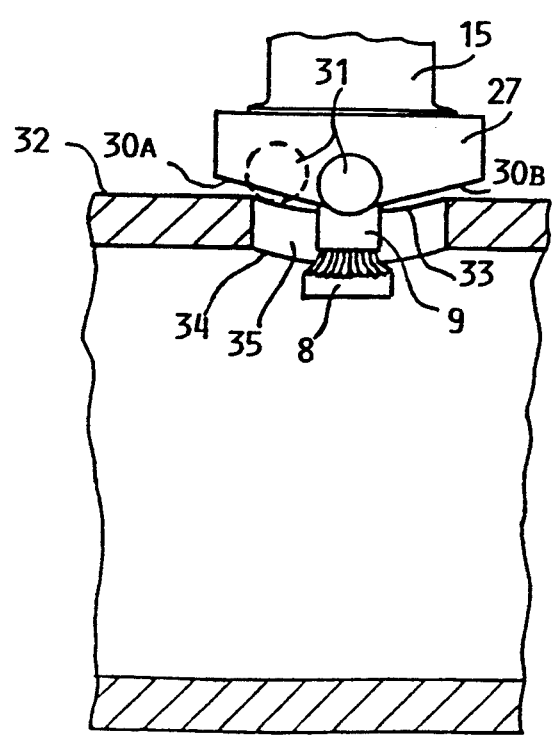

In FIG. 3 and 4 the designation 32 refers to the envelope surface of workpieces in the form of tubes, and 33 and 34 refer to the outer and the inner ends of a hole 35 in the different tubes.

The inner diameters of the second tube 10 and of the third tube 15 as well as the smallest inner diameters, of the support members 20 and 27 are all chosen so that they exceed the largest diameter of the cutting head 8.

FIG. 5 shows schematically in section a tool holder for a chamfering device, shown without power tool and from which portions have been omitted for the sake of clarity.

The tool holder according to this embodiment corresponds to that shown in FIG. 1 in that it incorporates a first tube 9, a second tubular element 10, which can be passed over the first tube 9 from the tool side thereof, and a third tubular member 15 which is displaceable on the second tube 10 in the axial direction thereof. A support member 20 having a tubular portion intended to be slid over and enclose the third tube 15, has a support surface 24 encircling the first tube 9 and being perpendicular thereto. This support member 20 is lockable to the third tube 15 by means of an 0-ring 22 projecting radially above the envelope surface of the third tube 15 from an external peripheral groove 23 in said third tube and entering in a corresponding internal groove 21 in the support member 20. When the support member 20 with its tubular portion is slid up on the third tube the 0-ring 22 first will be compressed in its seat or groove 23 in the third tube, whereupon it will again flex out when the support member 20 has been displaced so much that the groove 23 in the third tube and the groove 21 in the support member register. The support member then will be releasably locked in a predetermined position relative to the third tube 15. For adjustment of the axial position of the third tube 15 relative to the second tube 10, in this embodiment there is provided a mechanism differing from that according to the embodiment of FIG. 1, and this mechanism comprises an intermediate spacer ring 36 provided on the second tube 10 between a rearward end surface of the third tube 15 and an external, radial stop member 10A fitted to and projecting radially from the second tube 10. The spacer ring 36 is exchangeable and in this embodiment consists of a two-piece ring 36a, 36b, which is split with a division line 37 having two helical portions each covering half the circumference of the ring and being interconnected by axial portions, the helical portions of said division line each having a sawtooth shape. The tubular portion of the support member 20 extends in its position, where it is locked to the third tube 15, over the intermediate spacer ring 36 and encloses this, thus that it will be situated between the surface of the second tube 10, the stop member 10A, the end surface of the third tube 15 and the inner surface of the tubular portion of the support member 20.

By rotating the two pieces 36a and 36b of the intermediate spacer ring 36 relative to each other, it is possible to adjust the axial measure of the intermediate spacer ring 36 and thereby the distance between the third tube 15 and the second tube 10, which as in the embodiment according to FIG. 1 in use shall be fixedly attached to the not shown power tool. The distance between a rotary burr or the like fitted to the device and the support surface 24 of the support member 20 will thereby be adjustable in a favourable manner, resulting in a possibility to adapt the tool to workpieces of different thickness. By chosing a suitable pitch of the division line between the two spacer ring portions 36a, 36b it is possible to obtain quite a large adjustment distance, and it is furthermore possible to substitute the portions of the two-piece spacer ring for other portions having other axial length and/or other division line pitch.

FIGS. 6a to 6c show three spacer ring members 36a, 36a' and 6a" of the two-piece spacer ring 36 according to FIG. 5, said different spacer ring members having different length. FIGS. 6d and 6e show a mated pair of spacer ring members 36a' and 36b in two different mutual adjustment positions, and it is here clearly seen how the axial length of the two-piece spacer ring is different although the spacer ring members are the same in both examples.

FIG. 7 shows in a view corresponding to FIG. 5 a chamfering device adapted for deburring front edges of workpieces. The device incorporates a first tube 9, a second tube 10 and a support member 38, interconnected in a manner mainly corresponding to that according to the earlier embodiments, although in this embodiment the third tubular member has been omitted and the different elements are not designed like those according to the embodiments shown in FIG. 1 or in FIG. 5.

The support member 38 in this embodiment is designed with a nose portion enclosing the centre of the tool position but leaving free a lateral space through which the side of a rotary bur or the like can be reached with the edge of a workpiece the front edge of which shall be chamfered or deburred. In this embodiment the second tube 10 is fixedly connected to the first tube 9 by a screw joint or the like, whereas the support member 38 is rotatably supported relative to the second tube 10 via rows of balls 39 provided in seats in the second tube 10, and arranged to act as ball bearings rotatably supporting the support member 38. A steel ball 40 is provided in a circumferential groove in the second tube 10, thus that it projects radially from said groove, and it enters into a radial bore through the side wall of the third tube, thereby to prevent the support member 38 from sliding off the second tube axially. The ball 40 is secured from falling out off the radial bore by a locking O-ring 41 provided in a circumferential external groove on the third tube crossing the external opening of the said radial bore.

For adjustment of the cutting depth there is provided an exchangeable spacer ring 42 between the rear end of the second tube 10 and a rearward radial stop member 9C provided at the first tube 9. This spacer ring 42 in this embodiment is shown in undivided form, and may be substituted for other spacer rings of different length. The adjustment length required for chamfering front edges is not so big, whereby a few one-piece substitutable rings 42 mostly will be sufficient, but the spacer ring may also be made in two-piece form such as shown in FIG. 6a to 6e.

MOUNTING AND USE OF THE DEBURRING DEVICE

The first tube 9 is passed over a bur shaft 7 longer than the tube, thus that a rear portion of the bur shaft is free to be inserted in the collet of the power tool, in which it is clamped. The second tube 10 is thereupon passed over the bur and the first tube and is tightened on the thread 11 at the front end 1 of the power tool. During this operation the third tube 15 may already be affixed to the second tube, and also to the support member 20 or 27 and to the third tube, or alternatively these parts may be mounted afterwards.

When the second tube is affixed, the first tube will, due to the resistance from the locking ring 13, be pulled along upwards to engagement against the hexagonal head 4 of the collet. After having affixed the second tube the operator seizes, with his fingers, the protruding front portion 9a of the first tube and pulls it in a direction towards the cutting head 8, until the locking ring 13 snaps into the groove 12. The first tube is now arrested in position, so that it surrounds the bur shaft 7 with small clearance and with its front end almost reaching the cutting head 8.

With a mounted support member 20 in accordance with FIG. 1 the device according to the invention can now be used e.g. for deburring the lower or the rearmost edge of a hole 26 in a plane workpiece 25. By measurement and/or testing and accurate adjustment by means of the graduated scale 19, the position of the third tube 15 is set in relation to the thickness of the work piece, so that a correct distance is obtained between the lower side 24 of the support member 20 and the cutting head 8 of the bur.

After start of the power tool it is now possible to move the device around the periphery of the hole 26 in the workpiece, whereby the support surface 24 engages the top face of the workpiece and the portion 9A of the first tube engages the side wall of the hole. The axially acting support member 20 and the radially acting support in form of the tube portion 9A thereby together define the depth of the engagement of the cutting head 8 into the hole edge, so that a uniform chamfer of predetermined depth is obtained around the entire periphery of the hole 26.

In the same way it is also possible to chamfer and deburr straight or curved edge surfaces other than hole edges. It shall be observed that the cutting head 8 of the bur is exposed around its entire periphery and it is simultaneously supported by the tube 9 at any position around this. Therefore there is no need to rotate the device to any special engagement position, and the entire periphery of a hole can be followed without need for the chamfer device operator to make any rotational movements or changes of grip.

Chamfering and deburring of the internal opening of a hole drilled through the side wall of a tube constitutes a particular problem. FIG. 3 shows the device according to the invention provided with the same support member 20 as shown in FIG. 1. As it is not permitted to tilt the device, but the first tube 9 must be kept in parallel with the side wall of the hole 26 to obtain correct engagement position for the cutting head 8, the support member 20 will all the time rest on the highest point of the envelope surface 32 of the work piece. Therefore, if correct working depth has been set for the bur at the side of the hole where the cutting head 8 is indicated in dash lines, then the working depth will become incorrect when the bur has been brought a quarter of a revolution from said side to the position indicated by solid lines.

The problem with chamfering and deburring such hole edges is solved by providing the device with a support means 27 according to the FIG. 2 embodiment. As shown in FIG. 4, the device is kept positioned by the pins 31 of the support member being situated in transverse direction of the tubular workpiece. The lower side of the pins then follow the upper edge 33 of the hole 35 and give correct working depth to the cutting head 8 in the position where the pins 31 are shown in dash lines and also where they are shown in solid lines.

When using a support member 27 according to the embodiments and application examples in FIG. 2 and 4, it may be suitable to mount the chamfering device in a support arm system of parallelogram type, which allows movement of the device in desired directions and at the same time prevents its tilt angle from being changed.

When using a support member 20 according to the embodiment in FIG. 1, it may be preferable to make the support member, or at least the part of its end surface 24 intended to contact the workpiece, from a plastic material or the like, which does not scratch the workpiece.

With use of spacing members such as shown in the embodiments of FIG. 5 and FIG. 7 it is possible in a very simple manner to obtain the necessary positioning of the tool, without need of elements such as knobs and the like projecting laterally from the chamfering device.

The embodiments described and illustrated only constitute examples, and variations are possible within the scope of the following claims.

We claim:

1. A chamfering device incorporating a power tool for driving a rotary bur or the like, with an elongated tool shaft, one end of which is connected to the power tool and the other end of which is connected to a slender end portion of a cutting head, which in the longitudinal direction of the shaft from its said other end successively increases in diameter towards a more coarse portion thereof, said device for chamfering an edge of a workpiece adjacent a side of said workpiece, characterized therein that the shaft is with small clearance enclosed by a first, substantially tubular member arranged to engage said side of said workpiece laterally, and which first member extends over the shaft, and which first member, when the shaft is in mounted position in a collet in the power tool, is held in position by a second, substantially tubular member affixed to the power tool and interconnected to the first member and thereby arresting the position thereof, and a third, substantially tubular member provided outside the second member and being displaceable in the axial direction of the second member and lockable in occupied positions, said third tubular member being provided as an extension element for the second member, which element is adjustable to desired position.

2. A chamfering device as claimed in claim 1, wherein two elongated members are connectably and detachably arranged to project radially on two diametrically opposed sides from the third member for engagement against a workpiece.

3. A chamfering device as claimed in claim 1, wherein a graduated scale is provided on the second member, which scale is readable against an end surface of the displaceable third member.

4. A chamfering device as claimed in claim 1, wherein the first member has a portion of larger outer diameter than the largest diameter of the cutting head, and wherein the second member has an inner diameter thus chosen that with small allowance it encircles said portion of the first member, at least one locking member provided between the first and the second members for positional arresting of the members relative to each other.

5. A tool holder for a rotary chamfering tool having an elongated tool shaft connectable at one end to a driving device and having at its opposite end a cutting head for chamfering an edge of a workpiece adjacent a side of said workpiece, said to tool holder comprising in combination, a first, substantially tubular member extending coaxially to enclose said tool shaft, thus that the tool shaft is rotatable therein, said first tubular member having a surface for engaging the side of said workpiece, a second tubular member being coaxial with, enclosing and connected to said first tubular member along at least part of the extension thereof, a support member provided in connection to said cutting head and arranged to rest in use against a workpiece for giving the cutting head a correct work position, and which support member is connected to said second tubular member by means of adjustment means axially displaceable relative to the first tubular member.

6. A tool holder as claimed in claim 5, wherein the adjustment means is constituted by at least one exchangeable spacer member provided between a stop member axially arrested to the attachment of the tool holder in the driving device, and a member axially movable together with the support means relative to said first tubular member.

7. A tool holder as claimed in claim 6, wherein the spacer member is constituted by a two-piece spacer ring, the two halves of which are divided by means of a divisional line, comprising two helically sloping, sawtooth-shaped partition surfaces interconnected by means of axially extending portions, and adapted by mutual angular turning relative to each other about a common axial centre line, to be brought to take up different axial lengths.

* * * * *